INVENTOR.
RALPH D. PETRE.

Nov. 7, 1939.    R. D. PETRE    2,178,701
METHOD FOR APPLYING FLUIDS TO AND CLEANING ARTICLES
Filed May 28, 1936    2 Sheets-Sheet 2

INVENTOR
RALPH D. PETRE
ATTORNEY.

Patented Nov. 7, 1939

2,178,701

UNITED STATES PATENT OFFICE 2,178,701

METHOD FOR APPLYING FLUIDS TO AND CLEANING ARTICLES

Ralph D. Petre, Cleveland, Ohio

Application May 28, 1936, Serial No. 82,214

8 Claims. (Cl. 141—1)

This invention relates to a method for controlling the depth of penetration of liquids into articles to which the liquids are applied and particularly to a new and improved method and apparatus for cleaning air filters of the type commonly used in connection with the air intake of internal combustion automobile engines.

One of the principal objects of the present invention is to apply liquids to articles while limiting the penetration of liquids applied in those instances wherein penetration beyond predetermined limits is undesirable.

Another object is to subject the porous filters of filter units and the like to a forceful stream of cleaning liquid while limiting the depth of penetration of the liquid into the porous filter or while preventing the passage of the liquid appreciably beyond the particular filter subjected thereto.

A more specific object is to thoroughly clean the filter screens or porous cores of such air filters without removal of the same from the filter unit and while preventing the passage of the cleaning fluid into adjacent parts or cavities of the filter units.

Another specific object is to clean porous filter cores or screens more efficiently.

Figure 1:
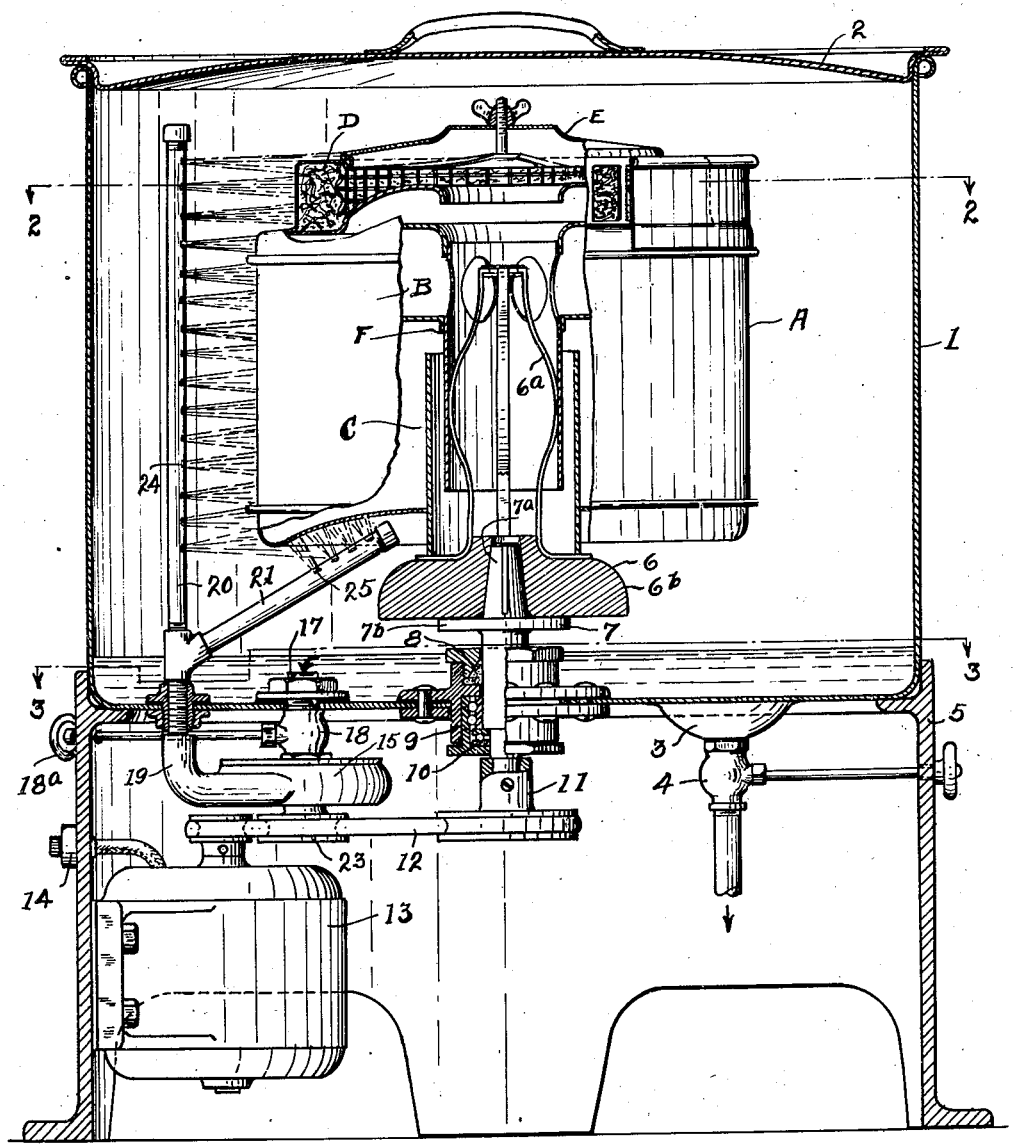
Figure 2:
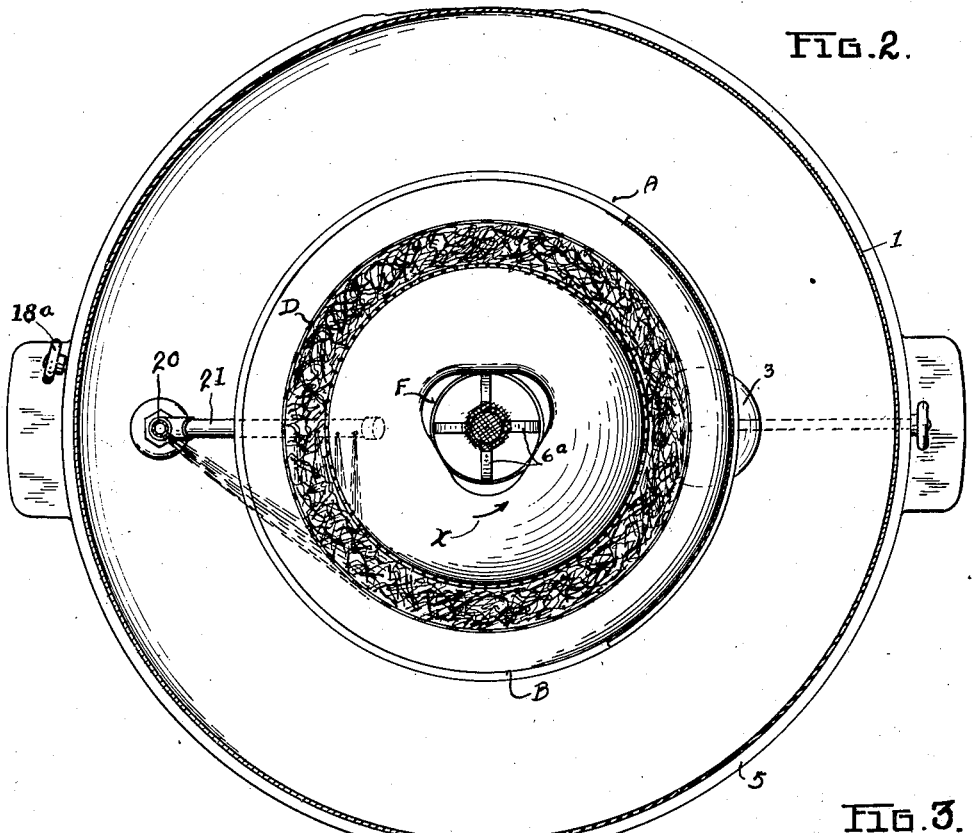
Figure 3:
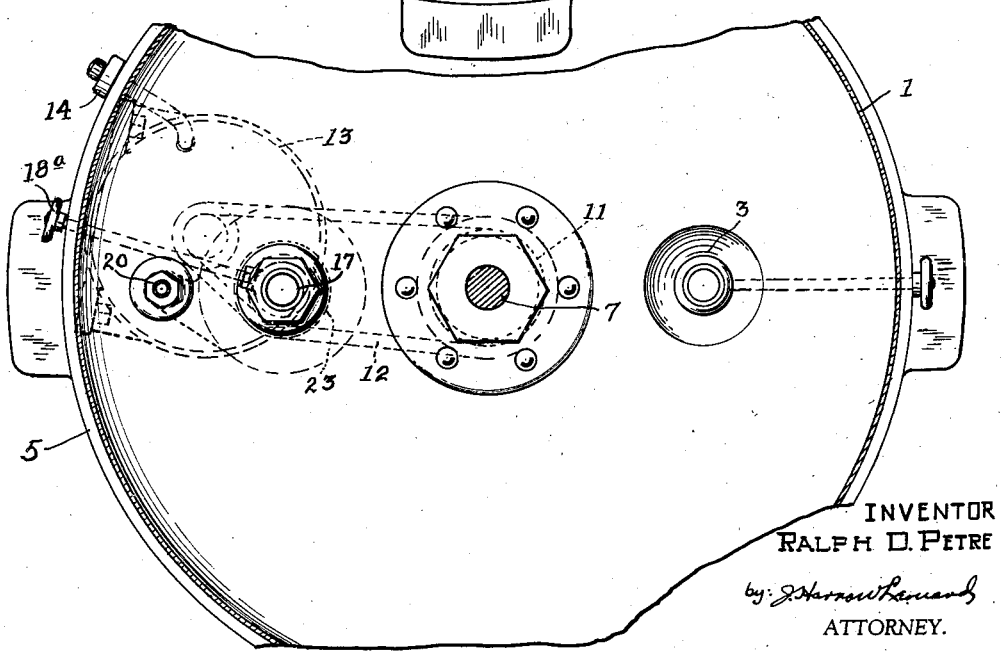

Other objects and advantages of the present invention will become apparent from the following specification wherein reference is made to the drawings in which:

Fig. 1 is a vertical sectional view through an apparatus embodying the principles of the present invention;

Figs. 2 and 3 are respectively horizontal sectional views taken on planes indicated by the lines 2—2 and 3—3 respectively of Fig. 1.

Referring to the drawings, the present invention will be described specifically, for illustrative purposes, in connection with the cleaning of an air filter of the type now commonly used on the air intake of automobile engines, the general application of the method and apparatus for other purposes being readily apparent therefrom.

In Fig. 1 is illustrated an air filter unit, designated generally as A, which comprises a substantially cylindrical muffling housing B having a centrally disposed axial tube C which is adapted for connection with the carburetor intake of an engine in connection with which the air filter is used. In the particular form illustrated, the air filter unit is provided with an annular filter screen D arranged on the top wall of the unit and closed at the top by a suitable cap E in such manner that the air drawn through the tube C must pass first through the filter screen D and a coaxial smaller diameter tube F.

With such an air filter, it is apparent that if cleaning liquid is forcefully applied on the screen D without any restriction of movement or if the unit is submerged in cleaning liquid, a considerable volume of the liquid will enter the exterior of the unit and become entrapped among the various baffles therein. It is extremely difficult to remove any such entrapped liquid from the filter unit, and, at best, the removal requires an unduly long period of time. If the unit is used on an engine while any liquid remains therein, a large amount of fumes from the liquid are drawn through the carburetor, causing an excessively rich or improper mixture which damages the engine and causes improper operation. Furthermore, if the liquid is finally removed by evaporation in this manner, grit and particles which have been removed from the screen or core and carried by the liquid into the filter unit subsequently become dry and free therein and are drawn into the carburetor or engine, often in a considerable mass, with well known undesirable effects.

Due to the extreme difficulty of removing cleaning liquid once it has entered the interior of the filter unit A, the present invention is provided for subjecting the screen D more forcefully and thoroughly to the cleaning liquid while preventing such entry of liquid into the unit in the first instance.

An apparatus for this purpose is illustrated and comprises a suitable liquid tight receptable 1 which is closed at the top by a removable cover 2. In the bottom of the receptacle is a suitable sediment pocket 3 which is provided with a stop cock 4 and drain line by which the sediment and cleaning liquid may be drained from the receptacle when desired.

The receptacle is supported on a suitable weight supporting base 5 which forms also a housing for operating mechanism later to be described.

Within the receptacle is an expansible chuck, designated generally as 6, which comprises a plurality of spring arms 6a secured in upright position on a suitable hub portion 6h. The arms 6a and hub 6b are so related that the arms, when compressed slightly, may be slid within and firmly engage the inner wall surface of the tube F of the unit to be cleaned, while the bottom edge of the tube C rests upon the upper surface of the hub 6b, thus fixedly mounting the filter unit A in coaxial and balanced relation on the chuck 6. The chuck 6, in turn, is supported on a suitable upright spindle 7 having a tapered portion 7a which is received snugly in a complementarily tapered bore in the hub 6b. The spindle 7 has a flange 7b which, when the tapered portion 7a is in snug fitting engagement with the bore of the chuck hub 6b, engages and forms the support for the under surface of the hub 6b, the flange 7b being sufficiently wide radially so that rocking of the chuck relative to the spindle 7 is prevented. A suitable spline, as illustrated, may be provided on the spindle portion 7a, if desired, for positively securing the chuck and spindle for rotation together.

The spindle, in turn, is rotatably mounted in upright position in the receptacle 1 and extends through the bottom thereof, a suitable packing gland 8, ball bearings 9, and thrust bearings 10 being provided to insure free rotation and accurate axial position.

The spindle 7 is driven from a suitable source of power so as to be rotated at various speeds, as desired. For the purposes of illustration, driving is accomplished by means of a pulley 11 carried on the outer end of the spindle 7 and drivingly connected by a suitable belt 12 to an electric motor 13. The motor 13 is preferably of the variable speed type, the speed being controlled by a suitable manual control 14 arranged on the outside of the support 5 so as to be readily accessible to the operator.

For supplying cleaning liquid under pressure, or as a forced stream, a pump 15 is provided which may be of the rotary type and which has an inlet 17 opening into the receptacle 1, through the bottom thereof, the inlet 17 being raised slightly above the bottom of the receptacle so as to prevent sediment from being drawn thereinto. A control valve 18 is interposed between the inlet 17 and pump 15 so that the volume and delivery pressure of the pump may be controlled by varying the effective size of the inlet. The valve 18, in turn, is operated by a manual control 18a extending to the outside of the support 5 and positioned in a readily accessible position. The discharge conduit 19 of the pump is connected, in turn, to spray nozzles 20 and 21 respectively. The nozzles 20 and 21 are preferably located within the interior of the receptacle 1, a suitable connection of the discharge conduit 19 therewith being effected through the bottom of the receptacle as illustrated.

The pump 15 is driven preferably by the motor 13, a convenient drive being effected through the medium of the belt 12 in engagement with a pulley 23 on the pump. It is to be understood, however, that variable speed gearing or other types of driving means may be used, if desired, for both the spindle and pump, the means shown being only illustrative.

The nozzle 20 preferably extends in upright position in the receptacle 1 so as to be alongside the filter unit A and is provided with a plurality of small discharge ports 24 uniformly distributed along its length. The ports 24 are positioned to discharge toward the filter almost tangentially to the screen D thereof but slightly inwardly from a tangent so as to impinge at a comparatively flat angle onto the screen D. The direction of discharge from the ports 24 is preferably generally in the same direction as the direction of rotation of the filter unit, as better illustrated by the arrow X in Fig. 2. The nozzle 20 may be rotated slightly about its axis so as to adjust the angle of impact of the liquid therefrom onto the filter unit A.

The nozzle 21 is correspondingly adjustable and extends along the underside of the filter and is provided with ports 25 which discharge against the underside of the filter at a comparatively flat angle and in the direction of rotation thereof. The nozzle 21 is arranged primarily for cleaning filters wherein the filter core or screen is arranged at the bottom but in the other types of filters it likewise provides for effective cleaning of the exterior of the filter unit.

As heretofore explained, the speed of the motor 13 may be varied or, more broadly, the delivery of the pump and angular velocity of the chuck 6 may be varied, as also may be direction of discharge of the nozzles 20 and 21. As a result, several different relations are possible for meeting substantially all conditions of cleaning. For example, in the case of a very porous screen or filter core, the ports 24 may be arranged to discharge at a less angle of impact than in the case of more dense or radially thicker filter screens or cores, thus controlling to some degree the depth of penetration of the liquid. Next, the delivery pressure and volume of the pump 15 may be controlled which, for any given angles of impact of the jets from the ports 24, permits additional variation of the depth of penetration of the liquid. Additionally the speed or angular velocity of the chuck may be controlled so that predetermined angular velocity of the filter A may be obtained.

Assuming, for example, that the filter is being rotated in a counterclockwise direction, as indicated by the arrow X in Fig. 2, and the jets in the respective nozzles are discharging onto the filter, as illustrated, the following results may be obtained. First, if the filter screen or core D requires a comparatively heavy and forceful jet of liquid at high velocity for penetration and cleaning of the screen entirely to its inner surface, this same large volume and force will cause the liquid to pass entirely through the filter and to travel toward the center of the filter unit and thus flow into the upper end of the tube F or into the interior of the unit. Likewise, if the screen D should be comparatively porous, the liquid could pass readily therethrough and a large amount of the liquid might pass in the form of spray into the interior of the tube F unless extreme care were exercised.

In order to permit a forceful application of the liquid to the filter screen D while at the same time arresting the inward flow into the unit after the liquid has penetrated to inner radial limits of the screen, the filter unit is rotated at high speed so that the centrifugal force exerted on the liquid controls its depth of penetration or controls its movement radially inwardly after it has passed through the screen. The greater the speed of rotation, the greater the centrifugal force and the less the depth of penetration while with slower rotation of the filter, other factors being constant, the greater is the depth of penetration or of flow of liquid toward the axis of the filter unit. By properly correlating the direction of discharge from the nozzles 20 and 21, the pressure and volume of liquid delivered by the pump 15, and the speeds of rotation of the chuck 6, a stream of liquid may be applied to the screen sufficiently abruptly and forcefully to insure loosening and removal of all foreign matter while at the same time it is prevented from passing beyond a predetermined radial limit and into the unit.

Furthermore, due to the rotation, liquid which is within the screen or core D is made to travel somewhat circumferentially therealong before its discharge so that each part of the screen is subjected not only to a somewhat radially delivered cleansing stream but also a circumferentially and outwardly flowing stream. Since these actions all take place concurrently, foreign matter which is loosened is kept continuously in motion. Due to the weight of such foreign matter it is discharged by centrifugal force quickly when loosened with the result that a filter core of any porosity or thickness may be cleaned effectively throughout while at the same time the cleaning liquid is prevented from entering the interior of the filtering unit.

If a more forceful application of the cleaning fluid is desired on a very porous core or screen, the angle of impact of the jets from the nozzles 20 and 21 may be increased, even until the jets are directed against the direction of rotation of the spinning filter unit. In any such instance, forceful impact of the liquid may be obtained primarily by the speed of the unit so that penetration of the liquid is not too great. Thus the force desired for mechanically loosening particles on the screen by the impact of the liquid may be obtained even with a less forceful stream and danger of too great penetration. On the other hand, for a more dense screen, the speed may be reduced and the force of the liquid increased by the pump so as to provide more force for penetration without so great offsetting centrifugal force. Thus an infinite number of combinations of spindle speeds and pressures and angles of impact of the liquid are obtainable.

While for purposes of illustration, I have described a preferred embodiment of my invention, it is apparent that in its broader aspects a method of controlling the depth of penetration of liquid into any articles to which applied is provided.

Having thus described my invention, I claim:

1. The method of applying a liquid agent to a porous article and controlling the depth of penetration of the agent into the article to which it is applied, which comprises applying the liquid agent to the article at its outer peripheral surface in a manner to cause the liquid agent to flow inwardly of and into the article and concurrently spinning the article at sufficient speed to subject the liquid agent to sufficient centrifugal force for arresting the inward flow of the liquid agent into the article at a predetermined depth of penetration and to reverse the flow, thereby limiting the depth of penetration of the liquid agent, and varying said speed to effect variation in the depth of penetration of the liquid agent into the article.

2. The method of applying the liquid agent to a porous article while controlling the depth of penetration of the agent which comprises simultaneously spinning the article while directing a stream of the liquid agent onto the peripheral surface of the article inwardly of the article with sufficient force to partially overcome the centrifugal force developed, by the spinning of the article, in the liquid which has entered into the article a predetermined distance.

3. The method of applying a liquid agent to a porous article and controlling the penetration of the agent into the article which comprises simultaneously spinning the article while directing a stream of liquid agent thereonto at the peripheral surface of the article and in a direction inwardly of the article and controlling the depth of penetration of the agent by controlling the relation between the speed of the article and the angle of impact of the agent onto the peripheral surface of the article.

4. The method of applying the liquid agent to a porous article which comprises simultaneously spinning the article and directing a stream of liquid agent thereonto at the peripheral surface and inwardly of the article and controlling the depth of penetration of the agent by controlling the relation between the angular velocity of the article and the velocity of discharge of the agent thereonto.

5. The method of applying liquid agent to a porous article while controlling the depth of penetration of the agent into the article which comprises spinning the article about its axis and concurrently directing a spray of liquid agent toward and onto the peripheral surface of the article in a non-radial direction with respect to the axis of rotation and controlling the depth of penetration of the liquid agent by controlling the relation between the speed of the article and the impact of the liquid agent thereonto.

6. The method of cleaning an air filter core with a liquid cleaning agent while the core is mounted in the air filter unit and while preventing the passage of the liquid cleaning agent into the interior of the unit which comprises applying the liquid cleaning agent to the outer peripheral surface of the core in a manner to cause the liquid agent to pass inwardly of the core and concurrently rotating the core about an axis within the limit of the outer peripheral surface of the core at a sufficient speed to oppose and restrain passage of the liquid cleaning agent inwardly of the core and toward the axis of rotation beyond a predetermined distance.

7. The method of cleaning an air filter core with a liquid cleaning agent while the core is mounted in an air filter unit and preventing the passage of the liquid cleaning agent into the interior of the air filter unit comprising rotating the filter unit about the axis of the core to be cleaned and concurrently directing a spray of the liquid cleaning agent onto the outer peripheral surface of the core and in a direction to cause the liquid agent to flow inwardly of the core and controlling the depth of penetration of the liquid agent by controlling the relation between the speed of the core and the impact of the liquid agent thereon.

8. The method of applying a liquid agent to a porous article and controlling the penetration of the agent into the article which comprises spinning the article about its axis and concurrently directing a stream of the liquid agent inwardly of the article from the outer peripheral surface and partially in the direction of rotation of the article, and controlling the depth of penetration of the liquid agent into the article by controlling the relation between the speed of the article and the angle of impact of the agent onto the outer peripheral surface.

RALPH D. PETRE.

CERTIFICATE OF CORRECTION.

Patent No. 2,178,701. November 7, 1939.

RALPH D. PETRE.

It is hereby certified that error appears in the printed specification of the above numbered patent requiring correction as follows: Page 1, second column, line 7-8, for the word "exterior" read interior; line 47, for "hub portion 6h" read hub portion 6b; and that the said Letters Patent should be read with this correction therein that the same may conform to the record of the case in the Patent Office.

Signed and sealed this 16th day of January, A. D. 1940.

(Seal)

Henry Van Arsdale,
Acting Commissioner of Patents.